United States Patent [19]

Letton et al.

[11] Patent Number: 5,306,515

[45] Date of Patent: * Apr. 26, 1994

[54] REDUCED CALORIE POURABLE SHORTENING, COOKING OILS, SALAD OILS OR LIKE COMPOSITIONS

[75] Inventors: James C. Letton, Forest Park; John R. Baginski, Loveland; Joseph J. Elsen, Cincinnati; Timothy B. Guffey, West Chester; James B. Hirshorn, Cincinnati; Jeffrey J. Kester, West Chester; David J. Weisgerber, Cincinnati, all of Ohio

[73] Assignee: The Procter & Gamble Company, Cincinnati, Ohio

[*] Notice: The portion of the term of this patent subsequent to Aug. 17, 2010 has been disclaimed.

[21] Appl. No.: 85,461

[22] Filed: Jun. 30, 1993

Related U.S. Application Data

[63] Continuation of Ser. No. 755,375, Sep. 5, 1991, abandoned, which is a continuation of Ser. No. 514,903, Apr. 26, 1990, abandoned.

[51] Int. Cl.$^5$ .................................................. A23L 1/00
[52] U.S. Cl. .................................... 426/531; 426/601; 426/804; 536/119
[58] Field of Search ............... 426/531, 601, 603, 606, 426/607, 611, 612, 804; 536/119

[56] References Cited

U.S. PATENT DOCUMENTS

| | | |
|---|---|---|
| 2,962,419 | 11/1960 | Minnich . |
| 3,093,481 | 6/1963 | Eckey et al. . |
| 3,158,490 | 11/1964 | Baur et al. . |
| 3,579,548 | 5/1971 | Whyte . |
| 3,600,186 | 8/1971 | Mattson . |
| 3,649,647 | 3/1972 | Ota et al. . |
| 3,932,532 | 1/1976 | Hunter et al. . |
| 3,963,699 | 6/1976 | Rizzi et al. . |
| 4,005,195 | 1/1977 | Jandacek . |
| 4,005,196 | 1/1977 | Jandacek . |
| 4,034,083 | 7/1977 | Mattson . |
| 4,368,213 | 1/1983 | Hollenbeck et al. . |
| 4,461,782 | 7/1984 | Robbins et al. . |
| 4,508,746 | 4/1985 | Hamm . |
| 4,517,360 | 5/1985 | Volpenhein . |
| 4,518,772 | 5/1985 | Volpenhein . |
| 4,582,715 | 4/1986 | Volpenhein . |
| 4,582,927 | 4/1986 | Fulcher . |
| 4,797,300 | 1/1989 | Jandacek . |
| 4,840,815 | 6/1989 | Meyer et al. . |
| 4,861,613 | 8/1989 | White et al. . |
| 4,880,657 | 11/1989 | Guffey et al. . |
| 4,888,195 | 12/1988 | Huhn et al. . |
| 4,940,601 | 7/1990 | Orphanos et al. ............. 426/601 |
| 5,236,733 | 8/1993 | Zimmerman et al. ............. 426/611 |

FOREIGN PATENT DOCUMENTS

| | | |
|---|---|---|
| 233856 | 8/1987 | European Pat. Off. . |
| 236288 | 9/1987 | European Pat. Off. . |
| 290065 | 11/1988 | European Pat. Off. . |
| 290420 | 11/1988 | European Pat. Off. . |
| 0290421 | 11/1988 | European Pat. Off. . |
| 311154 | 4/1989 | European Pat. Off. . |
| 0322027 | 6/1989 | European Pat. Off. . |
| 227137 | 9/1985 | Fed. Rep. of Germany . |
| 49-26220 | 3/1974 | Japan . |
| 52-27694 | 7/1977 | Japan . |
| 58-78531 | 5/1983 | Japan . |
| 59-143550 | 8/1984 | Japan . |
| 59-156242 | 9/1984 | Japan . |
| 63-78550 | 6/1989 | Japan . |

Primary Examiner—Donald E. Czaja
Assistant Examiner—Leslie Wong
Attorney, Agent, or Firm—Eric W. Guttag; Ronald L. Hemingway; Tara M. Rosnell

[57] ABSTRACT

Reduced fat and calorie pourable shortenings, cooking oils, salad oils or similar compositions are disclosed. The nondigestible portion of these compositions contain low levels of solids, yet still exhibit good passive oil loss control. These compositions also have good temperature cycling stability and they impart good organoleptic properties to foods prepared with them. Also disclosed are relatively clear oils with reduced calories, All these pourable compositions comprise specific solid polyol fatty acid polyesters, a liquid nondigestible oil and, optionally, a digestible oil and/or a hardstock fat.

33 Claims, No Drawings

REDUCED CALORIE POURABLE SHORTENING, COOKING OILS, SALAD OILS OR LIKE COMPOSITIONS

This is a continuation of copending application Ser. No. 07/755,375 filed Sep. 5, 1991 now abandoned, which is a continuation of application Ser. No. 07/514,903, filed on Apr. 26, 1990 now abandoned.

FIELD OF THE INVENTION

This invention relates to improved, nondigestible or reduced calorie pourable shortenings, cooking oils, salad oils or similar compositions. These pourable compositions contain specific solid polyol fatty acid polyesters in combination with a liquid nondigestible oil and, optionally, a digestible oil and/or a hardstock.

BACKGROUND ART

In recent years considerable attention has been focused on the amount of triglyceride fat in the diet from the standpoint of health concerns about obesity and hypercholesterolemia. Numerous patents have been directed to providing materials which have the physical and gustatory characteristics of triglyceride fats, but which are absorbed to a low extent or not at all by the body. These materials are referred to variously as noncaloric fats, pseudofats, nondigestible fats and fat substitutes. Patents pertaining to such materials include U.S. Pat. Nos. 4,582,927, Fulcher, issued Apr. 15, 1986, (fatty esters of malonic acid); 4,582,715, Volpenhein, issued Apr. 15, 1986, (alpha acetylated triglycerides); and 3,579,548, Whyte, issued May 18, 1971, (triglycerides of alpha-branched chain carboxylic acids).

One particular type of compound which has achieved considerable attention as a nondigestible fat is sucrose polyester (i.e., sucrose in which at least four of the eight hydroxyl groups are esterified with a fatty acid). U.S. Pat. Nos. 3,600,186, Mattson, issued Aug. 17, 1971; 4,368,213, Hollenbach et al. issued Jan. 11, 1983; and 4,461,782, Robbins et al. issued Jul. 24, 1984 describe the use of this material as a nondigestible fat in a variety of food compositions.

A problem associated with use of liquid nondigestible oils, i.e., those having a melting point below body temperature (about 37° C.), is an undesired passive oil loss effect, (hereinafter "oil loss") which is manifested in leakage of the liquid nondigested fat through the gastrointestinal tract's anal sphincter. Regular ingestion of moderate to high levels of completely liquid forms of these polyol polyesters can produce this passive oil loss. U.S. Pat. No. 4,005,195, Jandacek, issued Jan. 25, 1977, discloses the combining of higher melting fatty materials such as solid triglycerides and solid sucrose polyesters with the liquid sucrose polyesters in order to control oil loss.

U.S. Pat. No. 4,797,300 (Jandacek et al.), issued Jan. 10, 1989 discloses the use of certain solid sucrose polyesters which have high oil binding capacity for liquid sucrose polyesters (SPE) and liquid triglycerides, when used at levels of about 10% to 25% in said oils. It is disclosed that because of their high oil binding capacity, these solid sucrose polyesters have outstanding utility as agents to prevent passive oil loss of liquid nondigestible sucrose polyesters, and they are also useful as non-caloric hardstocks to use with liquid digestible or nondigestible oils in the preparation of semi-solid fat products such as shortenings and margarines. The oil binding agents of the Jandacek et al. '300 patent are solid sucrose polyesters wherein the ester groups consist essentially of a mixture of short chain saturated fatty acid ester radicals ($C_2$–$C_{10}$) and long chain saturated fatty acid radicals ($C_{20}$–$C_{24}$) in a molar ratio of short chain to long chain of from about 3:5 to about 5:3, and wherein the degree of esterification is from about 7 to about 8. Jandacek et al. also disclose plastic shortening and other food compositions containing 10–25% of the solid SPE.

U.S. Pat. No. 4,005,195 (Jandacek), issued Jan. 25, 1977 describes a means of preventing the undesirable oil loss effect through the addition of the polyesters as oil-loss control agents. The oil-loss control agents include solid fatty acids (melting point 37° C. or higher) and their triglyceride sources, and solid polyol fatty acid polyesters. Specifically $C_{10}$–$C_{22}$ saturated fatty acid polyesters are said to be useful at levels of at least 10%, preferably at least 20%.

U.S. Pat. No. 3,158,490 (Baur et al.), issued Nov. 24, 1964 discloses sucrose (and other disaccharide) polyesters which are useful as additives at 0.001% to 0.5% level in triglyceride salad oils to prevent clouding in low-temperature storage of the oils. The degree of esterification is at least 3, i.e., no more than 5 of the 8 hydroxyl groups are unesterified. The ester groups are a combination of: (1) from 15–85% saturated $C_{14}$–$C_{22}$ fatty acids, and (2) the balance selected from saturated $C_2$–$C_{12}$ or unsaturated $C_{14}$–$C_{22}$ fatty acids. Arachidic ($C_{20}$) and behenic ($C_{22}$) acids are recited as specific examples of (1) and acetic ($C_2$), caprylic ($C_8$), and oleic ($C_{18-1}$) acids are recited as specific examples of (2). At col. 2, lines 5–10, a sucrose ester having 2 oleic and 6 palmitic groups is disclosed, and it is stated that long chain saturated acids such as myristic, stearic, arachidic or behenic can be used in place of all or part of the palmitic.

While these references disclose shortenings and oil which provide oil loss control, none of the references addresses the problems associated with temperature cycling during typical storage conditions. In addition, none of the references recognizes that good oil loss control and good organoleptic properties can be achieved when the nondigestible portion of a reduced calorie shortening/oil has low solids levels (i.e. less than 10%).

It is, therefore, an object of the present invention to provide reduced calorie pourable shortenings, cooking oils, salad oils and the like with good temperature cycling stability and passive oil loss control. These compositions also impart good organoleptic properties to foods prepared with them.

It is another objective of the present invention to provide a relatively clear oil with reduced calories.

These and other objects of the invention will become evident from the disclosure herein.

SUMMARY OF THE INVENTION

Pourable compositions of the present invention contain: (A) a solid polyol fatty acid polyester having a complete melting point above about 37° C. wherein (i) the polyol has at least about 4 hydroxyl groups, (ii) the ester groups are comprised of (a) fatty acid radicals selected from the group consisting of $C_{12}$ or higher unsaturated fatty acid radicals, $C_2$–$C_{12}$ saturated fatty acid radicals or mixtures thereof, and (b) $C_{20}$ or higher saturated fatty acid radicals at a molar ratio of (a):(b) being from about 1:15 to about 2:1, and (iii) at least about 4 of the hydroxyl groups of the polyol are esterified; (B) a liquid nondigestible oil having a complete melting point below about 37° C.; (C) less than about 90% by weight of a digestible oil having less than 5% solids at 21° C.; and (D) less than 10% hardstock; wherein the ratio of (A) to (B) is from about 1:99 to about 9:91 wherein the pourable composition has a yield point of not more than about 100 dynes/cm$^2$, wherein at least 15% by weight of the fatty acid radicals in (A) are C$_{20}$ or higher saturated fatty acid radicals, wherein the slope of the SFC profile of the mixture of (A) and (B) between 37° C. and 21.1° C. is between 0 and about −.75, and wherein the combined level of of (A) and (B) in said composition is at least 10% by weight.

These compositions are useful as pourable shortenings, cooking oils, salad oils or similar compositions.

DEFINITIONS

As used herein the term "nondigestible" shall mean being absorbable to an extent of only 70% or less (especially 20% or less) by the human body through its digestive system.

As used herein, the term "pourable" refers to compositions which exhibit a yield point below 100 dynes/cm$^2$ as determined by the method described below.

As used herein "digestible triglyceride fat or oil" shall mean triglyceride fat or oil that is substantially completely digested by the body. Typically, at least about 90% of such triglyceride fats or oils are digested.

As used herein the terms "hardstock" and "hardstock fat" refer to triglycerides and/or polyol fatty acid polyesters having an iodine value which does not exceed 12. As used herein, "hardstock" or "hardstock fat" do not include the solid polyol fatty acid polyesters described in section A, below.

As used herein, the term "food" refers to any manner of viand for usage by man. "Food" may further include individual food components or mixtures thereof.

As used herein, the term "comprising" means various components can be conjointly employed in the fat compositions of the present invention. Accordingly, the term "comprising" encompasses the more restrictive terms "consisting essentially of" and "consisting of".

As used herein the term "clear" or "relatively clear" shall mean that these compositions appear relatively transparent or translucent when compared with commercial triglyceride cooking oils. This comparison is typically done in conventional glass or plastic cooking oil-type bottles. This clarity is characterized by an optical turbidity of not more than about 200 NTU as measured by a Hach turbidimeter (methodology described below).

All percentages and proportions herein are "by weight" unless otherwise specified.

DETAILED DESCRIPTION OF THE INVENTION

It has been found that nondigestible and reduced calorie pourable shortenings, cooking oils, salad oils or similar compositions can be prepared which exhibit passive oil loss control and improved temperature cycling stability, and which impart good organoleptic properties (i.e. good mouthfeel) to foods prepared with them. These pourable compositions contain low levels of specific solid polyol fatty acid polyesters in combination with a nondigestible oil component (typically at a nondigestible solid:liquid ratio of from about 1:99 to 9:91). These compositions also have excellent viscosity stability. Furthermore, at very low levels of solid polyol fatty acid polyester (from about 1% to about 5%), a relatively clear oil is produced (i.e. an optical turbidity <50 NTU). These oils remain relatively clear over a wide temperature range (from about 50° F. (10° C.) to about 105° F. (41° C.)). It is believed that these relatively clear oils may be more aesthetically pleasing to retail consumers versus prior opaque pourable compositions since they closely resemble clear commercially available triglyceride cooking/salad oils like PURITAN OIL ®, and CRISCO OIL ®.

The details of the present, improved pourable compositions are more completely discussed below:

A. Solid Polyol Fatty Acid Polyester Components

The solid polyol fatty acid polyesters of the present invention are polyol polyesters wherein the ester groups comprise a combination of: (a) long chain, unsaturated fatty acid radicals, short chain saturated fatty acid radicals, or mixtures thereof, and (b) long chain saturated fatty acid radicals, the ratio of (a):(b) being from about 1:15 to about 2:1, and wherein at least about 15% (preferably at least about 30%, more preferably at least about 50%, and most preferably at least about 60%) by weight of the total fatty acid radicals in the solid polyol polyester are C$_{20}$ or higher saturated fatty acid radicals. The long chain unsaturated fatty acid radicals are typically straight chain (i.e., normal) and contain at least about 12 (preferably about 12 to about 26, more preferably about 18 to 22, and most preferably 18 mono- and di- unsaturates) carbon atoms. The short chain saturated fatty acid radicals are typically normal and contain 2 to 12 (preferably 6 to 12 and most preferably 8 to 12) carbon atoms. The long chain saturated fatty acid radicals are typically normal and contain at least 20 (preferably 20 to 26, most preferably 22) carbon atoms. The molar ratio of Group (a) fatty acid radicals to Group (b) fatty acid radicals in the polyester molecule is from about 1:15 to about 2:1 (preferably about 1:7 to about 5:3, more preferably about 1:7 to about 3:5). The average degree of esterification of these solid polyol fatty acid polyesters is such that at least 4 of the hydroxyl groups of the polyol are esterified. In the case of sucrose polyesters from about 7 to 8 of the hydroxyl groups of the polyol are preferably esterified. Typically, substantially all (e.g., at least about 85%, preferably at least about 95%) of the hydroxyl groups of the polyol are esterified.

The polyols which are used in the solid polyol polyester compounds of the present invention preferably contain from about 4 to about 11 (more preferably 4 to 8, most preferably 6 to 8) hydroxyl groups.

Examples of preferred polyols are sugars (including monosaccharides and disaccharides and trisaccharides) and sugar alcohols, containing from 4 to 11 hydroxyl groups. The trisaccharides raffinose and maltotriose are examples of sugars which contain 11 hydroxyl groups. The preferred sugars and sugar alcohols are those which contain 4 to 8 (more preferably 6 to 8) hydroxyl groups. Examples of those containing four hydroxyl groups are the monosaccharides xylose and arabinose and the sugar alcohol erythritol. Suitable five hydroxyl group-containing polyols are the mono-saccharides galactose, fructose, mannose and glucose, and the sugar alcohol xylitol. A polyol containing six hydroxyl groups is sorbitol. Examples of disaccharide polyols which can be used include maltose, lactose, and sucrose, all of which contain eight hydroxyl groups. Examples of other suitable polyols are pentaerythritol, diglycerol, triglycerol, alkyl glycosides, and polyvinyl alcohols. The preferred polyol is sucrose.

Examples of suitable Group (a) long chain unsaturated fatty acid radicals for the solid polyol polyesters herein are lauroleate, myristoleate, palmitoleate, oleate, elaidate, erucate, linoleate, linolenate, arachidonate, eicosapentaenoate, and docosahexaenoate. For oxidative stability, the mono- and/or diunsaturated fatty acid radicals are preferred. Examples of suitable short chain saturated fatty acid radicals are acetate, caproate, caprylate, caprate, and laurate.

Examples of suitable Group (b) long chain saturated fatty acid radicals are arachidate, behenate, lignocerate and cerotate.

Of course, the Group (a) fatty acid radicals can be used singly or in mixtures with each other in all proportions. Likewise, the long chain saturated radicals can be used in combination with each other in all proportions. Mixed fatty acid radicals from source oils which contain substantial amount of the desired unsaturated or saturated acids can be used as the fatty acid radicals to prepare compounds of the invention. The mixed fatty acid radicals from the oils should contain at least about 30% (preferably at least about 50%, most preferably at least about 80%) of the desired unsaturated or saturated acids. For example, rapeseed oil fatty acid radicals or soybean oil fatty acid radicals can be used instead of pure $C_{12}$–$C_{26}$ unsaturated fatty acids. Hardened (i.e., hydrogenated) high erucic rapeseed oil fatty acids can be used instead of pure $C_{20}$–$C_{26}$ saturated fatty acids. Preferably the $C_{20}$ and higher acids (or their derivatives - e.g., methyl esters) are concentrated, for example by distillation. The fatty acids from palm kernel oil or coconut oil can be used as a source of $C_8$ to $C_{12}$ acids. An example of the use of source oils to make solid polyol polyesters of the invention is the preparation of solid sucrose polyester, employing the fatty acids of high oleic sunflower oil and substantially completely hydrogenated high erucic rapeseed oil. When sucrose is substantially completely esterified with a 1:3 by weight blend of the methyl esters of the fatty acids of these two oils, the resulting sucrose polyester will have a molar ratio of unsaturated $C_{18}$ acid radicals to $C_{20}$ and higher saturated acid radicals of about 1:1 and 28.6 weight percent of the total fatty acids in the polyester will be $C_{20}$ and $C_{22}$ fatty acids. The higher the proportions of the desired unsaturated and saturated acids in the fatty acid stocks used in making the solid polyol polyester, the more efficient the ester will be in its ability to bind liquid oils.

The preferred unsaturated fatty acid radicals are those which have 18 carbon atoms and are mono- and/or diunsaturated. Preferred short chain fatty acid radicals are those which have 8–12 carbon atoms. The preferred long chain saturated fatty acid radical is behenate. The preferred ratio of Group (a) fatty acid radicals to Group (b) fatty acid radicals is from about 1:7 to about 5:3 (preferably 1:7 to 3:5). Preferred solid polyol polyesters of the invention are polyesters of sucrose in which at least 7 of the 8 hydroxyl groups are esterified.

Examples of solid polyol polyesters of the present invention are sorbitol hexaester in which the acid ester radicals are palmitoleate and arachidate in a 1:2 molar ratio; the octaester of raffinose in which the acid ester radicals are linoleate and behenate in a 1:3 molar ratio; the heptaester of maltose wherein the esterifying acid radicals are sunflower seed oil fatty acids and lignocerate in a 3:4 molar ratio; the octaester of sucrose wherein the esterifying acid radicals are oleate and behenate in a 2:6 molar ratio; and the octaester of sucrose wherein the esterifying acid radicals are laurate, linoleate and behenate in a 1:3:4 molar ratio. A preferred material is sucrose polyester in which the degree of esterification is 7–8, and in which the fatty acid radicals are $C_{18}$ mono- and di- unsaturated and behenic, in a molar ratio of 2:6.

The solid polyol polyesters used in the present invention can be made according to prior known methods for preparing polyesters of polyols. Since the sucrose polyesters are the preferred solid polyol polyesters herein, the invention will be exemplified primarily by these materials. One such method of preparation is by reacting the acid chlorides of the fatty acids with sucrose. In this method a mixture of the acid chloride or acid anhydrides of the fatty acids can be reacted in one step with sucrose, or the acid chlorides can be reacted sequentially with sucrose. Another preparation method is by the process of reacting methyl esters of the fatty acids with sucrose in the presence of a fatty acid soap and a basic catalyst such as potassium carbonate. See, for example, U.S. Pat. Nos. 3,963,699, Rizzi et al., issued Jun. 15, 1976; 4,518,772, Volpenhein, issued May 21, 1985; and 4,517,360, Volpenhein, issued May 14, 1985, and U.S. Ser. No. 417,990, Letton, filed Oct. 6, 1989, all incorporated herein by reference.

When using the methyl ester route for preparing the solid polyol polyesters herein, the fatty acid methyl esters are blended in the desired ratio and reacted with sucrose by transesterification to obtain the sucrose esters of mixed unsaturated/saturated or saturated fatty acids. In a preferred way of practicing the methyl ester process, five moles of the blended saturated/unsaturated or saturated methyl esters are reacted with sucrose in a first stage at 135° C. to obtain partial esters of sucrose. An additional nine moles of the blended esters are then added and the reaction continued at 135° C. under reduced pressure until the desired degree of esterification has been attained.

The solid polyol polyesters used in the present invention have complete melting points above 37° C., preferably above about 50° C. and most preferably above about 60° C. (Unless otherwise specified, all melting points reported herein are measured according to the method described below.) These solid materials have the ability to trap relatively large amounts of oil within their crystal structure.

B. Liquid Nondigestible Oil Components

The solid polyol fatty acid polyester materials of the present invention have the ability to trap large amounts of oil within their crystal structure. As a consequence, they can be blended in rather small amounts (i.e., as low as about 1%) with liquid nondigestible oils (i.e., those having complete melting points below about 37° C., preferably below about 21° C.) in order to trap the oils and thereby control passive oil loss upon ingestion of food compositions containing the nondigestible oil. The solid polyol fatty acids described above can be blended at levels of from about 1% to about 9% with these nondigestible oil components, or more precisely, the ratio of solid polyol fatty acids to nondigestible oil in the present pourable compositions can range from about 1:99 to about 9:91.

Mixtures of solid polyol polyesters of the invention with liquid nondigestible oils are further characterized in having a relatively flat solids content profile across the temperature range of from typical room temperature to body temperature, i.e., from about 21.1° C. (70° F.) to about 37° C. (98.6° F.). The slope of the SFC profile is expressed as the change in percent solids per unit change in temperature, in °F. Typically the slope of the Solid Fat Content (SFC) profile between these temperatures is less between 0 and −0.75. Generally, the greater the weight percent of $C_{20}$, or higher saturated fatty acid radicals in the solid polyol polyester, the flatter the SFC profile slope will be. For example, at the 30% $C_{20}$ or higher fatty acid level the slope will typically be between 0 and −0.5, and at 50% it will typically be between 0 and −0.3.

Determination of SFC values over a range of temperatures can be done by a method involving PNMR (Pulsed Nuclear Magnetic Resonance). Such method is well known to those skilled in the art (see *J. Amer. Oil Chem. Soc.*, Vol. 55 (1978), pp. 328–31, and A.O.C.S. Official Method Cd. 16-81, Official Methods and Recommended Practices of The American Oil Chemists Society, 3rd. Ed., 1987; both incorporated herein by reference).

Examples of nondigestible edible oils which can be used in compositions of the invention are liquid polyesters of sugars and sugar alcohols (U.S. Pat. No. 4,005,195, Jandacek, issued Jan. 25, 1977); liquid alkyl glycoside polyesters (U.S. Pat. No. 4,840,815 (Meyer et al.), issued Jun. 20, 1989); liquid esters of tricarballylic acids (U.S. Pat. No. 4,508,746, Hamm, issued Apr. 2, 1985); liquid diesters of dicarboxylic acids such as derivatives of malonic and succinic acid (U.S. Pat. No. 4,582,927, Fulcher, issued Apr. 15, 1986); liquid triglycerides of alpha-branched chain carboxylic acids (U.S. Pat. No. 3,579,548, Whyte, issued May 18, 1971); liquid ethers and ether esters containing the neopentyl moiety (U.S. Pat. No. 2,962,419, Minich, issued Nov. 29, 1960; liquid fatty polyethers of polyglycerol (U.S. Pat. No. 3,932,532, Hunter et al., issued Jan. 13, 1976); liquid polyesters of two ether-linked hydrocarboxylic acids (e.g., citric or isocitric) (U.S. Pat. No. 4,888,195 to Huhn et al., issued Dec. 19, 1988); liquid esters of epoxide-extended polyols (U.S. Pat. No. 4,861,613 to White et al., issued Aug. 29, 1989); all incorporated herein by reference. Edible polydimethyl siloxanes (e.g., Fluid Silicones available from Dow-Corning Corporation) constitute another type of nondigestible oil which can be used in the compositions herein.

The solid polyol polyesters of the present invention can be used in mixtures with other solid polyol polyesters, solid fatty acids or solid triglycerides such as disclosed in U.S. Pat. No. 4,005,195 (Jandacek), issued Jan. 25, 1977, in order to control oil loss resulting from ingestion of nondigestible liquid polyol polyesters. They can also be combined with intermediate melting mixtures of liquid and solid nondigestible polyol polyesters such as those disclosed in U.S. Pat. No. 4,880,657 (Guffey et al.), issued Nov. 14, 1989. Both patents are incorporated by reference herein.

When substituting the present nondigestible oil/solid polyol polyester compositions for fat in foods which contain fat and non-fat ingredients (e.g., starches, sugar, non-fat milk solids, etc.) the solid polyol polyesters are included to control passive oil loss when said foods are ingested. In such products the mixture of solid polyol polyester of the invention and nondigestible oil is substituted for up to 100% of the fat normally present in such foods.

Preferred nondigestible oils are polyol fatty acid polyesters wherein the polyol is a sugar or sugar alcohol having at least 4 hydroxyl groups (preferably 4 to 8 hydroxyl groups). Examples of such are raffinose octaoleate, sucrose octaoleate, and sorbitol hexalinoleate.

C. Liquid Digestible Oil Components

The pourable compositions of the present invention optionally comprise less than about 90%, preferably less than about 65%, most preferably less than about 50%, and very most preferably 35%, liquid digestible oil having less than 5% solids at or below 70° F. (21° C.), preferably having a complete melting point below 50° F. (10° C.) and most preferably having a complete melting point below 40° F. (4° C.)). The digestible oil can be an edible glyceride oil or a partially hydrogenated glyceride oil or fat having the above specified solids content or complete melting point. Suitable digestible oils can be derived from animal, vegetable, or marine sources, including naturally occurring triacylglyceride oils and fats such as cottonseed oil, soybean oil, peanut oil, olive oil, palm oil, corn oil, rapeseed oil, canola oil, sunflower seed oil, sesame oil, safflower oil, coconut oil, palm kernel oil, sardine oil, lard, tallow and the like. Very highly unsaturated oils may require some hydrogenation to improve their resistance to oxidative deterioration. Reducing the level of triunsaturated fatty acids to less than about 4% is desirable for oxidative stability. Hydrogenation to reduce the iodine value of these highly unsaturated oils to less than about 120 generally is sufficient for purposes of this invention. It is also possible to reduce the level or triunsaturated fatty acids by selective breeding. Methods for hydrogenating unsaturated oils are well known in the art. A preferred base stock is canola oil, having an iodine value of from about 70 to about 120, preferably from about 90 to about 110.

Other suitable digestible oils having less than 5% solids at or below 70° F. (21° C.) for use in this invention can be derived from natural or synthetic fats and oils containing in the glyceride molecule long chain acyl radicals having from about 12 to about 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupanodonoyl, lignoceroyl, and/or selacholeoyl. A portion of the base stock glyceride also can contain in the molecule one or two short chain acyl groups having from 2 to about 10 carbon atoms such as acetyl, propanoyl, butanoyl, pentanoyl, hexanoyl and the like. Suitable digestible oils can be derived from randomly and low temperature interesterified fatty triglyceride containing oils and fats such as interesterified cottonseed oil and lard.

Triglyceride oils useful in the pourable compositions of the present invention can include certain triglycerides in which one or two of the OH groups of the glycerol molecule have been substituted with acetyl, propionyl, butyryl, or caproyl radicals, and the remaining OH groups of the glycerol molecule have been substituted with acyl radicals of higher molecular weight saturated or unsaturated fatty acids having from 12 to 22 carbon atoms. For the purposes of the present invention, these glycerides containing both high and low molecular weight acid radicals are referred to as low molecular weight synthetic fats. The low molecular synthetic fats selected should be fluid or liquid at 25° C. In order to resist oxidation and to prevent 20 rancidity, it is preferred to select low molecular weight synthetic fats in which there are a minimum of carbon-to-carbon double bonds in the higher molecular weight fatty acid radicals, and preferably not more than two double bonds in any single acid radical. Normally liquid fatty acids of the oleic acid series, having a single carbon-to-carbon double bond, are ideal for this purpose.

Suitable partial hydrogenation of liquid oil to form a preferred digestible oil of this invention can be carried out by conventional methods, and is typically carried out by a process whereby the oil is contacted with hydrogen in the presence of nickel catalyst.

D. Hardstock Fat

The pourable shortening compositions of the present invention may optionally contain an additional solid component. This component is referred to as a hardstock fat. The pourable composition comprises from 0% to about 10% polyol fatty acid esters hardstock and/or triglyceride hardstock. The hardstock tends to retain added materials, e.g., salt, flavorings, silicone, etc., in suspension.

The triglyceride component of the hardstock fat is a substantially completely hydrogenated triglyceride fat or oil having an iodine value not exceeding about 12. The hardstock fat can be obtained by hydrogenating naturally occurring oils such as palm oil, cottonseed oil, soybean oil, sunflower oil, corn oil, peanut oil, canola oil, rapeseed oil, and the like, or mixtures thereof. Preferred hardstocks are those that are triglycerides containing tristearin or tripalmitin. Certain vegetable oils or fractions thereof contain these predominantly beta triglycerides, for example, hardened soybean oil.

Hardened polyol fatty acid polyesters having an iodine value not more than about 12 are also useful as the hardstock fat. The hardstock polyesters can contain more saturated than unsaturated fatty acids, and more longer than shorter fatty acid chains. Typical examples of hardstock polyol polyesters include sucrose octastearate, sucrose octapalmitate, sucrose heptastearate, xylitol pentastearate, galactose pentapalmitate, sucrose hepta and octaesters of soybean oil fatty acids that have been hydrogenated to an iodine value of from about 1 to about 12, and the like.

E. Other Shortening Ingredients

The present pourable compositions may also comprise other shortening ingredients. Various additives can be used herein provided they are edible and aesthetically desirable and do not have any detrimental effects on the shortenings. These additives include flavorings, emulsifiers, anti-spattering agents, anti-sticking agents, anti-oxidants, anti-foaming agents (for frying applications) or the like.

F. Pourable Compositions

A primary benefit of the present pourable compositions is their physical stability over a wide range of storage temperatures. Specifically, in pourable shortenings and oils the slope of solids fat content profile over the range of temperatures encountered during the processing, packing, warehousing, shipping and subsequent consumer storage conditions of such compositions must be relatively flat. If the slope of solids profile is not relatively flat across this temperature range (from about 50° F. (10° C.) to about 105° F. (41° C.)), finished product which crystallizes and melts and recrystallizes in moving across this range will lose the texture intended for best appearance and performance. The present pourable compositions do not have this limitation. One indicator of temperature cycling stability is the Solid Fat Content (SFC) profile. The SFC profile slope of the nondigestible components is an indicator of stable fluidity during temperature cycling.

The present pourable compositions maintain acceptable fluidity over the range of typical storage conditions. This characteristic can not be achieved with substantial amount of previous nondigestible-containing compositions with passive oil loss control, like those described in U.S. Pat. No. 4,880,657, Guffey et al., issued Nov. 14, 1989. It should also be noted that, as in the case in typical triglyceride pourable shortenings and oils, other factors can also affect fluidity and stability (e.g. type and level of hardstock).

Typically, the present pourable compositions have a fluidity at 21° C. of greater than 5 gm/30 sec. (preferably, for cooking oils, greater than 15 gm/30 sec. and preferably for salad oils greater than 25 gm/30 sec.).

It has also been discovered that pourable compositions which contain ratios of the solid polyol fatty acid polyesters to nondigestible oil between about 1:99 and about 5:95 (preferably between about 1:99 and about 3:97) appear relatively clear when stored in conventional glass or plastic cooking oil-type bottles. This clarity is characterized by an optical turbidity of not more than about 200 NTU (preferably not more than about 100 NTU, more preferably not more than about 50 NTU and most preferably not more than about 5 NTU) as measured by a Hach turbidimeter (methodology described below). The relatively clear oils of the present invention can also optionally contain from 0% to about 90% digestible oil (clarity increases with the amount of clear digestible oil added).

It has been observed that the processing of the pourable composition also has a marked effect on the clarity of the product. Without being bound to theory, it is believed that (a) the refractive index of the materials, (b) the efficiency of the solid polyol polyester to bind the liquid nondigestible oil (i.e. less solid polyester is used as efficiency increases) and (c) the level of trapped air in the composition all affect clarity. With regard to refractive index, a composition tends to be clearer when the refractive index of the solid and liquid portions are nearly the same. With regard to efficiency of the solid, it has been observed that certain solid polyol polyesters are more efficient at binding liquid (specifically those with a Group (a) to Group (b) fatty acid radical ratios of 2:6 and 1:7). It is believed that the short chain saturated Group (a) fatty acid radical-containing solids are better at forming a clear oil than the long chain unsaturated Group (a) radicals (possibly due to the inclusion of insoluble long chain saturates which normally accompany the source oils used to make the longer chain unsaturated fatty acid radical-containing solids). It should also be pointed out that the purity of the solid polyol polyester can also affect clarity. Higher levels of nonfunctional fatty acids (usually introduced by the source oil used in the solid polyester manufacturing process) should be avoided. The geometry of the solid polyester particles is also a factor. Spherulitic shaped solid particles are preferred over rods, cones or other shapes which tend to exaggerate cloudiness. It is also desirable to produce small solid particles, below the shortest wavelengths of visible light (i.e.. <0.3 $\mu$m). The more particles that are sized below this wavelength, the clearer the resultant oil. Increasing the concentration of particles which are sized greater than the wavelength of visible light results in increased cloudiness. It should be noted that the concentration of the solids may offset particle size, i.e. if the particle size is greater than the wavelength of visible light and is present at high concentration, this material may also appear cloudier than a sample having low concentrations of a larger particle size. With regard to trapped air, higher viscosity oils have a tendency of trapping air bubbles which produces a cloudiness. Accordingly, the clear oils of the present invention should be deaerated to improve clarity.

The pourable compositions of the present invention may be processed by techniques commonly employed to crystallize fats, e.g., passing the composition through scraped surface heat exchangers. Particular techniques may be additionally employed to achieve relatively small particle sizes such as the addition of low levels of crystal inhibitors (e.g. lecithin) or use of sonication to reduce particle size. Clear oils (e.g., salad oils) of the present invention are stable over time when small particle size (less than 3 μm, preferably less than 1 μm) are achieved. Larger particles tend to settle, leaving a layer of clear oil.

F. Preferred Pourable Compositions

Preferred pourable shortenings according to the present invention are comprised of: (A) a solid polyol fatty acid polyester having a complete melting point above 37° C. wherein (i) the polyol is sucrose, (ii) the ester groups are comprised of (a) fatty acid radicals selected from the group consisting of $C_{12}-C_{26}$ mono- and di- unsaturated fatty acid radicals, $C_6-C_{12}$ saturated fatty acid radicals, or mixtures thereof, and (b) $C_{20}-C_{26}$ saturated fatty acid radicals at a molar ratio of (a):(b) being from about 1:7 to about 3:5, and (iii) at least about 6 of the hydroxyl groups of the polyol are esterified with said fatty acid groups; (B) a liquid nondigestible sucrose fatty acid polyester oil having a complete melting point below about 37° C.; (C) less than about 90% by weight of a digestible oil having less than about 5% solids at 21° C.; and (D) less than about 10% hardstock, wherein (i) the ratio of (A) to (B) is from about 1:99 to about 9:91, (ii) the pourable composition has a yield point of not more than about 100 dynes/cm², (iii) the fluidity at 21° C. is at least 5 gm/30 sec, (iv) at least 30% by weight of the fatty acid radicals in (A) are $C_{20}$ or higher saturated fatty acid radicals, and (v) the slope of the SFC profile of the mixture of (A) and (B) between 37° C. and 21.1° C. is between 0 and about −0.5.

Preferred cooking oils according to the present invention are comprised of: (A) a solid polyol fatty acid polyester having a complete melting point above 37° C. wherein (i) the polyol is sucrose, (ii) the ester groups are comprised of (a) fatty acid radicals selected from the group consisting of $C_{18}-C_{26}$ mono- and di- unsaturated fatty acid radicals, $C_6-C_{12}$ saturated fatty acid radicals, or mixtures thereof, and (b) $C_{20}-C_{26}$ saturated fatty acid radicals at a molar ratio of (a):(b) being from about 1:7 to about 3.5, and (iii) at least about 6 of the hydroxyl groups of the polyol are esterified with said fatty acid groups; (B) a liquid nondigestible sucrose fatty acid polyester oil having a complete melting point below about 21° C.; and (C) less than about 90% by weight (more preferably 10%-75%, most preferably 10%-60%, very most preferably 10%-40%) of a digestible oil having a complete melt point less than 10° C., wherein (i) the ratio of (A) to (B) is from about 1:99 to about 9:91, (ii) the pourable composition has a yield point not more than about 100 dynes/cm², (iii) the fluidity at 21° C. is at least 15 gm/30 sec., (v) the optical turbidity is not more than 200 NTU, (vi) at least 30% by weight of the fatty acid radicals in (A) are $C_{20}$ or higher saturated fatty acid radicals, and (vii) the slope of the SFC profile of the mixture of (A) and (B) between 37° C. and 21.1° C. is between 0 and about −0.5.

Preferred salad oils according to the present invention are comprised of: (A) a solid polyol fatty acid polyester having a complete melting point above 37° C. wherein (i) the polyol is sucrose, (ii) the ester groups are comprised of (a) fatty acid radicals selected from the group consisting Of $C_{18}$ mono- and diunsaturated fatty acid radicals, $C_8-C_{12}$ saturated fatty acid radicals, or mixtures thereof, and (b) $C_{20}-C_{26}$ saturated fatty acid radicals at a molar ratio of (a):(b) being from about 1:7 to about 3:5, and (iii) at least about 6 of the hydroxyl groups of the polyol are esterified with said acid groups; (B) a liquid nondigestible sucrose fatty acid polyester oil having a complete melting point below 21° C.; and (C) less than about 90% by weight of a digestible oil (more preferably 20%-75%, most preferably 20%-60%, very most preferably 20%-40%) having a complete melt point below 4° C., wherein (i) the ratio of (A) to (B) is from about 1:99 to about 3:97, (ii) the pourable composition has a yield point not more than about 100 dynes/cm², (iii) the fluidity at 21° C. is at least 25 gm/30 sec., and (iv) the optical turbidity is not more than about 50 NTU, (v) at least 30% by weight of the fatty acid radicals in (A) are $C_{20}$ or higher saturated fatty acid radicals, and (vi) the slope of the SFC profile of the mixture of (A) and (B) between 37° C. and 21.1° C. is between 0 and about −0.5.

G. Uses of the Pourable Compositions

The present pourable compositions are useful in the preparation of a wide variety of food and beverage products. These pourable shortenings and oils can be used in frying applications such as the preparation of french fried potatoes, potato chips, corn chips, tortilla chips, chicken, fish, and battered and fried foods (e.g. shrimp tempura). Preferably, the present pourable compositions can be used as shortenings, cooking oils, frying oils, salad oils, and popcorn oils. These pourable compositions may also be used in cooking sprays, margarines and spreads. The individual pourable composition components may be mixed before preparing foods or they can be added separately to the foods.

These pourable shortening and oils can also be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, granola bars, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, and baked farinaceous snack foods, and other baked salted snacks.

The pourable compositions herein can also be used as a component of the fat portion of many other foods such as ice cream, frozen desserts, cheese, meats, chocolate confections, salad dressings, mayonnaise, margarine, spreads, sour cream, yogurt, coffee creamer, extruded snacks, roasted nuts and beverages, such as milk shakes.

The pourable compositions of the present invention can be used to substitute from about 10% to 100% of the fat/oil in foods. When substituting the present pourable compositions for fat in foods which contain fat and non-fat ingredients (e.g., starches, sugar, non-fat milk solids, etc.) the solid polyol polyesters are included to control passive oil loss of the nondigestible oil when said foods are ingested. In such products the pourable mixture of solid polyol polyester and liquid nondigestible oil is substituted for up to 100% of the fat normally present in such foods. The weight ratio of solid polyol polyester to liquid nondigestible oil will typically be in the range of from about 1:99 to about 9:91.

The present pourable compositions can also be fortified with vitamins and minerals, particularly the fat-soluble vitamins. The fat-soluble vitamins include vitamin A, vitamin D, and vitamin E. (See U.S. Pat. No. 4,034,083 (Mattson) issued Jul. 5, 1977, incorporated by reference herein.)

The pourable compositions herein can be used in combination with other nondigestible fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the materials herein are medium chain triglycerides, triglycerides made with combinations of medium and long chain fatty acids (like the ones described in European Application 0322027 (Seiden), published Jun. 28, 1989, incorporated herein by reference), highly esterified polyglycerol esters, acetin fats, plant sterol esters, polyoxyethylene esters, jojoba esters, mono/diglycerides of fatty acids, and mono/diglycerides of short-chain dibasic acids.

The pourable compositions are particularly useful in combination with particular classes of food and beverage ingredients. For example, an extra calorie reduction benefit is achieved when the present pourable shortenings are used with noncaloric or reduced calorie sweeteners alone or in combination with bulking agents. Noncaloric or reduced calorie sweeteners include, but are not limited to, aspartame, saccharin, alitame, thaumatin, dihydrochalcones, acesulfame and cyclamates.

Bulking or bodying agents are useful in combination with the pourable compositions herein in many food compositions. The bulking agents can be nondigestible carbohydrates, for example, polydextrose and cellulose or cellulose derivatives, such as carboxymethylcellulose, carboxyethylcellulose, hydroxypropyl methylcellulose, hydroxypropylcellulose, methyl cellulose and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

Similarly, food and beverage compositions can be made that combine the present pourable compositions with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and manmade fibers (for example, by bacterial synthesis). Commercial fibers such as purified plant cellulose, or cellulose flour, can also be used. Naturally occurring fibers, such as psyllium, and fibers from whole citrus peel, citrus albeds, sugar beets, citrus pulp and vesicle solids, apples, apricots, and watermelon rinds.

These dietary fibers may be in a crude or purified form. The dietary fiber used may be of a single type (e.g., cellulose), a composite dietary fiber (e.g., citrus albedo fiber containing cellulose and pectin), or some combination of fibers (e.g., cellulose and a gum). The fibers can be processed by methods known to the art.

Of course, judgment must be exercised to make use of the present pourable compositions and combinations thereof with other food ingredients. For example, a combination of sweetener and present pourable compositions would not be used where the specific benefits of the two are not desired. The pourable composition and pourable composition/ingredient combinations are used where appropriate, and in appropriate amounts.

Many benefits are obtained from the use of the present pourable composition in food and beverage compositions, either when used alone or in combination with edible oils and/or other ingredients discussed above. A primary benefit is the calorie reduction achieved when pourable compositions are used as a total or partial fat replacement. This calorie reduction can be increased by using combinations of the present pourable compositions with reduced calorie sweeteners, bulking agents, or other nondigestible fats and oils. Another benefit which follows from this use is a decrease in the total amount of digestible fats in the diet. Furthermore, a significant reduction in saturated fat consumption can be achieved by substituting the present pourable compositions for saturated fats in the diet. Foods or beverages made with the nondigestible solid fat materials instead of animal-derived triglyceride fats will also contain less cholesterol, and the ingestion of these foods can lead to reduced serum cholesterol and thus reduced risk of heart disease. Also, compositions made with these fat materials have acceptable organoleptic properties, particularly lack of waxiness.

Dietary foods can be made with the pourable compositions, to meet special dietary needs, for example, of persons who are obese, diabetic, or hypercholesterolemic. The present pourable compositions can be a major part of a low-fat, low-calorie, low-cholesterol diet, and they can be used alone or in combination with drug therapy or other therapy. Combinations of food or beverage products made with the present pourable compositions can be used as part of a total dietary management regimen, based on one or more of these products, containing the fat materials alone or in combination with one or more of the above-mentioned ingredients, to provide one or more of the above-mentioned benefits.

This discussion of the present pourable compositions uses, combinations, and benefits is not intended to be limiting or all-inclusive. It is contemplated that other similar uses and benefits can be found that will fall within the spirit and scope of this invention.

In addition to food compositions, the compositions of the present invention can be used in formulating lubricants, skin creams, pharmaceuticals, cosmetics, and the like.

The invention will be illustrated by the examples which follow the analytical methods.

Analytical Methods

A. Solid Fat Content

Before determining Solid Fat Content (SFC values, a sample of the pourable composition or mixture of nondigestible liquid/solid is heated to a temperature of 140° F. (60° C.) or higher for at least 30 minutes or until the sample is completely melted. The melted sample is then tempered as follows: at 80° F. (26.7° C.) for 15 minutes; at 80° F. (26.7° C.) for 15 minutes; at 32° F. (0° C.) for 15 minutes; at 80° F. (26.7° C.) for 30 minutes; and at 32° F. (0° C.) for 15 minutes. After tempering, the SFC values of the sample at temperatures of 50° F. (10° C.), 70° F. (21.1° C.), 80° F. (26.7° C., 92° F. (33.3° C.) and 98.6° F. (37° C.), can be determined by pulsed nuclear magnetic resonance (PNMR) after equilibration for 30 minutes at each temperature. The method for determining SFC values by PNMR is described in Madison and Hill, *J. Amer. Oil Chem. Soc.*, Vol. 55 (1978), pp. 328-31 (herein incorporated by reference). Measurement of SFC by PNMR is also described in A.O.C.S. Official Method Cd. 16-81, Official Methods and Recommended Practices of The American Oil Chemists Society, 3rd. Ed., 1987 (herein incorporated by reference).

The slope of the SFC profile is calculated by subtracting the percent solids at 70° F. from the percent solids at 98.6° F. and dividing that value by 28.6.

B. Turbidity Determination

Equipment:
Hach Ratio/XR Turbidimeter, Model 43900, Manufactured by Hach Co., Loveland, Colo.
25 mm sample cells (Hach catalog Number 20849-00)
180 NTU formazin standard
Calibration:
Perform the following steps with the instrument in the fast response mode.

With the instrument warmed up and the cell holder empty, place the light shield over the cell holder opening and select the 2 range. Adjust the front panel ZERO control for a reading of 0.000. Remove the rubber plug from the right side of the instrument case to gain access to the calibration controls. Select the 20-NTU range. Place a sample cell containing an 18-NTU formazin standard into the instrument with the index mark on the sample cell aligned with the raised mark on the spill ring. Cover it with the light shield. Using the calibration tool, adjust the 20-200 S (span) control to obtain a display of 18.00. Select the 200-NTU range. Place a sample cell with a 180-NTU formazin standard into the instrument, aligning the sample cell index mark with the mark on the spill ring. Cover it with the light shield. Use the calibration tool to adjust the 20-200 L (linearity) control to obtain a display of 180.0. Adjustment of either of the span or linearity controls will affect the setting of the other. Repeat Steps d through i until readings of 18.00 and 180.0 are achieved on each range, respectively. Select the 2000-NTU range. Place a sample cell with 180-NTU formazin standard into the instrument, aligning the sample cell index mark with the mark on the spill rang. Cover it with the light shield. Using the calibration tool, adjust the 2K range S (span) control to obtain a reading of 180.0 NTU. Place a sample cell with an 1800-NTU formazin standard into the instrument, aligning the sample cell index mark with the mark on the spill ring. Cover it with the light shield. Use the calibration tool to adjust the 2K range L (linearity) control to obtain a display of 1800. Again place the 180-NTU formazin standard into the instrument. If interaction with the linearity adjustment caused a change in the 180 reading, repeat steps 1 through p.

Measuring Turbidity:
The sample turbidity is measured as follows: Verify that the power switch is turned on and that the instrument has had a 15-minute warm-up. Select 0-200 NTU range. Wait at least 15 seconds in each range to allow the instrument to stabilize. Select the lowest range possible without having an overrange condition. An overrange condition, sample turbidity higher than the top of the range, is evidenced by a flashing display of $-1.888$, $-18.88$, $-188.8$ or $-1888$, depending on the selected range. Fill a clean sample cell to the mark with deaerated test sample and place it into the cell holder. The sample cell must be clean, dry and free of fingerprints. Coat the sample cell with a thin coat of silicone oil to mask imperfections in the glass. Insert the sample in the instrument, aligning the cell index mark with the raised mark on the spill ring around the cell holder opening. Be sure the cell is down completely and held in place by the spring clip. Cover the sample with the light shield. Read the turbidity of the sample from the digital display. (Units are NTU)

C. Fluidity

Apparatus
Constant temperature box controlled at $70\pm1°$ F. Balance any with 0.1 gram accuracy Cup 4 oz. or equivalent Fluidometer (Saybolt cup with a Furol orifice mounted with an electric timing device to control flow for a 30 second interval.)
Sample Preparation
Sample is to be equilibrated 24 hours in constant temperature box at $70°+/-1°$ F.
Operation
1) Invert sample (turn 180 degrees and return to original position) 20 times or shake sample 10 times to thoroughly mix the sample.
2) Place toggle switch in automatic position.
3) Tare the paper cup on the balance and then place it under the Saybolt tube.
4) Fill the Saybolt cup with sample to overflow top edge of the inner tube.
5) Push start button. Timer controls the preparation until test is finished.
6) Weight and record the amount of product in the cup.
7) Repeat steps 3 through 6 two more times.
8) Place the toggle switch in the manual position.
9) Hold start button down and remove excess sample from the Saybolt cup by pushing plunger down into cup.
10) Fluidity=grams/30 seconds as an average of three weights from step 6.

D. Yield Point

Apparatus:
Contraves Rheomat 115 manufactured by Contraves AG, Zurich, Switzerland, controlled rate rheometer with cone and plate attachment.
Method: Gap is set automatically. Calibrate torque meter to 0.0.
1) Measuring apparatus is allowed to equilibrate to a temperature of $70.0°$ F.$\pm0.1°$ F.
2) Sample is applied to plate and cone is allowed to gently settle onto plate.

3) Run scan shown below:

|  | Curve 1 |
| --- | --- |
| Sensitivity | 1.0 |
| First minimum shear rate (sec.$^{-1}$) | 0.000 |
| Time at minimum shear rate (sec.) | 120.0 |
| Ascending ramp time (sec.) | 60.0 |
| Maximum shear rate (sec.$^{-1}$) | 20.000 |
| Hold time (sec.) | 10.0 |
| Second minimum shear rate (sec.$^{-1}$) | 0.000 |
| Descending ramp time (sec.) | 60.0 |

4) At completion of test, instrument calculate yield point and thixotropic area using Casson-Steiger Model. The yield point is defined as the shear stress required to cause flow.

E. Fatty Acid Composition of Polyol Polyesters

The fatty acid composition (FAC) of the polyol polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure 1-$C_e$62.

F. Ester Distribution of Sucrose Polyesters

The relative distribution of the individual octa-, hepta-, hexa- and penta- esters, as well as collectively the tetrathrough monoesters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

G. Complete Melt Point

Equipment:
Perkin-Elmer 7 Series Thermal Analysis System, Model DSC7, manufactured by Perkin-Elmer, Norwalk, Conn.

Procedure:
1) Sample is heated to at least 10° C. above the complete melting point and mixed thoroughly.
2) 10±2 mg. of sample is weighed into sample pan.
3) A scan is performed from about 10° C. above the complete melting point to −60° C. at 5° C. per minute.
4) The temperature of the sample is maintained at −60° C. for 3 minutes and scanned from −60° C. to the original starting temperature at 5° C. per minute (i.e. about 10° C. above the complete melting point).
5) The complete melting point is the temperature at the intersection of the baseline (specific heat line) with the line tangent to the trailing edge of the endothermic peak.

EXAMPLE I

Preparation of Tetrabehenyl Tetracaprylyl Sucrose (Methyl Ester Route)

An alternative method for preparation of $C_8$–$C_{22}$ sucrose polyesters is by a modification of the process described in U.S. Pat. Nos. 4,518,772, supra, and 4,517,360, supra. Sucrose is reacted with methyl caprylate in the presence of a potassium soap and a basic catalyst such as $K_2CO_3$ to form sucrose octacaprylate. The octacaprylate is then reacted with methyl behenate in the presence of sodium methoxide for an interesterification to the $C_8$–$C_{22}$ product of interest.

| Chemicals: | Mol. Wt. | Wt. (g) | Moles | Mole Ratio |
| --- | --- | --- | --- | --- |
| A. Reaction | | | | |
| 1. Sucrose | 342.3 | 300.00 | 0.0204 | 1 |
| 2. Potassium Behenate | 387.60 | 124.10 | 0.328 | 0.375 |
| 3. Methyl Caprylate | 158.24 | 1663.40 | 6.132 | 7.000 |
| 4. Methyl Behenate | 354.60 | 2174.40 | 6.132 | 7.000 |
| 5. Potassium Carbonate | 138.21 | 12.107 | 0.0876 | 0.100 |
| 6. Sodium Methoxide | 54.00 | (½% by wt. of mixture) | | |
| B. Solvents | | | | |
| 1. Methanol | | | | |
| 2. Hexane | | | | |

Procedure:
Step A—Preparation of Potassium Behenate
Methyl behenate (0.375 moles/mole of sucrose to be used in Step B) is saponified by stirring at reflux in methanol containing an equivalent amount of KOH. The reaction is stirred with heating until all methyl ester has been converted to soap as indicated by infrared analysis. The soap solution is used, as is in the next reaction step.

Step B—Preparation of Sucrose Octacaprylate
Methyl caprylate (12 moles/mole of sucrose) is added directly to the potassium behenate-methyl alcohol solution from Step A above. The mixture is stripped under vacuum to remove the methanol. Sucrose and potassium carbonate are then added to the soap-methyl caprylate mixture and the reaction mixture heated to 135° C. and placed under a partial vacuum.

The reaction is allowed to proceed until the sucrose is converted to its octacaprylate. The endpoint is determined by liquid or super critical fluid chromatography.

The reaction mixture is cooled to 95° C. and 7% $H_2O$ is added to form the hydrate of the soap.

The soap separates as a sludge and is removed by centrifugation, filtration and/or decantation. The oil layer (sucrose octacaprylate/methyl ester layer) is washed several times with hot water, separated and the residual water removed by $N_2$ sparging at 110° C.

The crude octacaprylate is then decolorized with a mixture of filtrol and celite and the bleaching earths removed by vacuum filtration. The excess methyl esters are removed by distillation at 130° C. and 1 mm Hg.

Step C—Preparation of $C_8$—$C_{22}$ Sucrose Polyesters
Sucrose octacaprylate (from Step B above) and 7 moles of methyl behenate are combined with sodium methoxide in a reactor. While stirring, the temperature is raised to 120° C. and the reactor placed under vacuum.

The methyl caprylate formed during interesterification is distilled from the reaction mixture and collected. The reaction is continued until 4–5 moles of methyl caprylate are collected (the ratio of $C_8$–$C_{22}$ on the sucrose may be adjusted by the amount of methyl caprylate removed).

The reaction mixture is then cooled to 90° C. and neutralized with glacial acetic acid.

The product is diluted with hexane and the hexane solution washed several times with hot water.

The water washes are separated and the hexane, along with any residual water, is removed via $N_2$ sparging at 110° C. The product is then rediluted with hexane and is decolorized with a mixture of charcoal and filtrol.

The charcoal/filtrol is removed by vacuum filtration and the solvent removed by vacuum distillation. Excess and/or residual methyl esters are removed by thin film evaporation and the product crystallized from a hexane/reethanol solution.

(Steam stripping at 210° C. and 1 mm Hg is an optional final step.)

EXAMPLE II

Preparation of a Solid Sucrose Polyester from Methyl Esters Containing High Proportions of $C_{18}$ Unsaturates and $C_{22}$ Saturates This example describes the preparation of solid sucrose polyesters of this invention by a modification of the process described in U.S. Pat. Nos. 4,518,772, supra, and 4,517,360, supra.

High erucic acid rapeseed oil (HEAR) is blended with low erucic acid rapeseed oil (LEAR) to a composition of 38% erucic acid. The rapeseed oil blend is mixed with 3%-6% refined, bleached cottonseed oil to obtain an oil composition having approximately 35% of $C_{22}$ acid (i.e., behenic plus erucic). This rapeseed/cottonseed stock is then hydrogenated to an iodine value less than 4. Hydrogenation is done with nickel catalyst levels typical of any vegetable oil using 0-100 psig pressure, and a temperature of approximately 375° F.

The material is deodorized at a temperature of 375°-495° F. The hardened, deodorized rapeseed/cottonseed oil has the following characteristics: fatty acid composition: 3-7% $C_{16:0}$, 45-55% $C_{18:0}$, 0-2% $C_{18:1}$, 0-1% $C_{18:2}$, 4-8% $C_{20:0}$, 33-37% $C_{22:0}$, 0-1% $C_{22:1}$, 0-2% $C_{24:0}$. Free fatty acid content is 0.01-0.1% and Lovibond red color is about 1.0.

The rapeseed/cottonseed oil is converted into methyl esters through an esterification process in which the oil is mixed with methanol, a sodium methoxide catalyst is added, and the reaction is continued until all the triglycerides are converted into methyl esters. Glycerine is settled by gravity after the reaction is completed. The esters are then water washed with hot water to remove trace levels of glycerine and soap. The water phase is settled out by gravity after each wash.

The esters are flash distilled in a batch mode to both remove unsaponifiable materials and to obtain a more concentrated $C_{22}$ material. The distillation is done under a vacuum of 0.5-2 mm Hg and a temperature of 300°-410° F. The last 10%-15% of the esters distilled are collected into a clean vessel for use in making the desired sucrose polyester. The other 85-90% is discarded. The ester composition of the last 10-15% collected is: 4% $C_{18:0}$, 6% $C_{20:0}$, 87% $C_{22:0}$, 3% $C_{24:0}$. These are esters "A".

Refined and bleached sunflower oil is deodorized at a temperature of 375°-495° F. under vacuum. The deodorized sunflower oil has the following characteristics: Iodine Value: 125-140; fatty acid composition: 5-10% $C_{16:0}$, 2-6% $C_{18:0}$, 19-26% $C_{18:1}$, 63-74% $C_{18:2}$, 0-2% $C_{18:3}$, 0-1% $C_{20:0}$, 0-1% $C_{22:0}$. Free fatty acid content is 0.01-0.1% and Lovibond red color is about 1.3.

The sunflower oil is converted into methyl esters through the same esterification process as described above. The esters are flash distilled in a batch mode, primarily to remove unsaponifiable materials. The distillation is done under a vacuum of 0.5-2.0 mm Hg and a temperature of 300°-410° F. These are esters "B".

About 70.5 Kg of methyl esters of a refined soybean oil, fatty hardened to an IV of about 2, are mixed with 209 Kg of methanol and 15.4 Kg of potassium hydroxide in a stainless steel batch reactor. The mixture is heated to about 145° F. (63° C.) with agitation for 1 to 3 hours at atmospheric pressure. During this time, all but a residual amount of the methyl esters are saponified to make soap.

About 1193.6 Kg of ester "A" is blended with 241.4 Kg of ester "B" to make ester blend "C". The ester composition of blend "C" is: 1.2% $C_{16:0}$, 3.8% $C_{18:0}$, 3.8% $C_{18:1}$, 10.7% $C_{18:2}$, 4.7% $C_{20:0}$, 71.9% $C_{22:0}$, 3% $C_{24:0}$. About 545.5 Kg. of ester "C" are added to the previously made soap mixture.

About 104.5 Kg of granular sucrose are then added to give a 5:1 molar ratio of methyl ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C.). This is to remove the methanol. A vacuum is then pulled and the mixture agitated for up to 8 hours to form the mono-, di- and trisucrose esters. Small quantities of tetra- and pentaesters are also formed during this stage. Additional methyl ester "C" (890 Kg) which has been preheated to 275° F. (135° C.) is added to bring and maintain the molar ratio of the esters to sucrose to 14-15:1. Additional potassium carbonate is then added twice to the mixture (each addition being approximately 0.5 wt. percent of the initial reaction mix). When the reaction conditions stabilize at 275° F. (135° C.), a nitrogen sparge is used to improve agitation and promote methanol stripping. This second reaction stage lasts approximately 4 to 13 hours.

The reaction mixture is then cooled under nitrogen to between 149° F. (65° C.) and 185° F. (85° C.). The crude reaction mixture is agitated with about 91 Kg water. The hydrated crude reaction mixture is passed through a centrifuge to separate a heavy and a light phase. The heavy phase which contains the soaps, excess sugars and potassium carbonate is discarded. The light phase was then washed with an additional 264 Kg of water.

The light phase, which contains methyl esters and the sucrose polyester is then dried to remove moisture at 170° F.-190° F. (76°-88° C.) under 70 mm Hg or less vacuum for 30 to 60 minutes. Filtrol 105 (1.0 wt. percent) is added and the mix is agitated at 167° F. (75° C.) to 190° F. (88° C.). The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 0.5 mm Hg of vacuum.

The sucrose polyester is then deodorized by passing downward through a stainless steel packed column deodorizer or other suitable device at 392° F. (200° C.) to 450° F. (232° C.) under a vacuum of about <25 mm Hg. Steam is introduced to the bottom of the column and passes counter-currently to the sucrose polyester. Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. The sucrose polyester is stored in clean stainless steel drums.

Sucrose polyester made according to this procedure has the following approximate composition and properties:

|  | Wt. % |
|---|---|
| Fatty Acid Composition | |
| $C_{16}$ | 1.2 |
| $C_{17}$ | 0 |
| $C_{16:1}$ | 0 |
| $C_{18}$ | 4.6 |
| $C_{18:1}$ | 3.7 |
| $C_{18:2}$ | 10.9 |
| $C_{18:3}$ | 0 |
| $C_{20}$ | 4.6 |
| $C_{20:1}$ | 0 |
| $C_{22}$ | 71.7 |
| $C_{22:1}$ | 0.2 |
| $C_{24}$ | 2.8 |
| Others | 0.4 |
| Iodine Value | 22.4 |
| Complete Melting Point | 70.4° C. |
| Ester Distribution | |
| Octa | 71.6 |
| Hepta | 28.2 |
| Hexa | 0.2 |
| Penta | <0.1 |
| Lower | <0.1 |

By varying the fatty acid composition of ester "A" and/or ester "B", and/or varying the ratio of ester "A" and ester "B" in preparing ester "C", this process can be used to make other solid sucrose polyol polyesters of the invention.

EXAMPLE III

Preparation of a Pourable Shortening

| Formulation: | Wt. % |
|---|---|
| Solid sucrose fatty acid polyester (prepared according to the method of Example II) | 1.75% |
| Liquid sucrose fatty acid polyester Nondigestible oil (prepared by the methyl ester route from a soybean oil source. Complete melting point of 12.1° C. and an I.V. of 89) | 33.25% |
| Liquid digestible triglyceride oil (unhardened soybean oil) | 65.00% |
|  | 100.00% |

The above ingredients have the following compositions (% wt):

|  | Polyester Solid (%) | Liquid Nondigestible (%) |
|---|---|---|
| Fatty Acid Composition | | |
| C8 | — | — |
| C10 | — | — |
| C12 | 0 | — |
| C14 | 0 | — |
| C16 | 1.2 | 9.7 |
| C17 | 0 | 0.1 |
| C18 | 4.6 | 5.9 |
| C18:1 | 3.7 | 64.5 |
| C18:2 | 10.9 | 18.9 |
| C18:3 | 0 | 0.2 |
| C20 | 4.6 | 0.3 |
| C22 | 71.7 | 0.2 |
| C22:1 | 0.2 | — |
| C24 | 2.8 | — |
| Other | 0.4 | 0.2 |
| Ester Distribution. | | |
| Octa | 71.6 | 78.7 |
| Hepta | 28.2 | 21.0 |
| Hexa | 0.2 | 0.2 |
| Penta | <0.1 | 0.2 |
| Lower | <0.1 | 0.1 |

The above ingredients are mixed at approximately 80° C. and agitated, then cooled to room temperature. The final product has the following physical attributes:
Fluidity 21 gms/30 sec
Yield Point 8 dynes/cm$^2$

EXAMPLE IV

Preparation of a Cooking Oil

| Formulation: | Wt. % |
|---|---|
| Solid sucrose fatty acid polyester (prepared according to the method of Example II) | 1.05% |
| Liquid sucrose fatty acid polyester non-digestible oil (prepared by the methyl ester route from a soybean oil source. Complete melting point of 17.0° C. and an I.V. of 80) | 33.95% |
| Liquid digestible triglyceride oil (unhardened canola) | 65.00% |
|  | 100.00 |

The above ingredients have the following compositions (% wt):

|  | Polyester Solid (%) | Liquid Nondigestible (%) |
|---|---|---|
| Fatty Acid Composition | | |
| C8 | — | — |
| C10 | — | — |
| C12 | — | — |
| C14 | — | — |
| C16 | 1.2 | 10.0 |
| C16:1 | 0 | .1 |
| C17 | 0 | 0 |
| C18 | 4.6 | 8.0 |
| C18:1 | 3.7 | 69.1 |
| C18:2 | 10.9 | 11.1 |
| C18:3 | 0 | 0.2 |
| C20 | 4.6 | 0.3 |
| C20:1 | 0 | 0.3 |
| C22 | 71.7 | 0.2 |
| C22:1 | 0.2 | 0 |
| C24 | 2.8 | 0 |
| Other | 0.4 | 0.7 |
| Ester Distribution. | | |
| Octa | 71.6 | 91.0 |
| Hepta | 28.2 | 9.0 |
| Hexa | 0.2 | <.1 |
| Penta | <0.1 | <.1 |
| Lower | <0.1 | <.1 |

The above ingredients are mixed at approximately 80° C. and then cooled in a scraped wall heat exchanger using −10° F. brine solution with a heat exchanger outlet temperature of about 17° F. The sample is then deaerated to insure no air bubbles are trapped within the sample. The final product has the following physical attributes:

| Yield Point | 12 dynes/cm² |
|---|---|
| Fluidity at 21° C. | 20 gm/30 sec |
| Clarity as measured in NTU at 21° C. | 106 |
| Microscopic particle size of about | 0.5 μm |

EXAMPLE V

Preparation of a Salad Oil

| Formulation: | |
|---|---|
| Solid sucrose fatty acid polyester (prepared according to the acid chloride method of Example I. C$_{22}$ fatty acid purified by fractional distillation) | 0.35% |
| Liquid sucrose fatty acid polyester nondigestible oil (prepared by the methyl ester route from a soybean oil source. Complete melting point of 13.1° C. and an I.V. of 89) | 34.65% |
| Liquid triglyceride digestible oil (unhardened canola) | 65.00% |
| | 100.00% |

The above ingredients have the following compositions (wt %):

| | Polyester Solid (%) | Liquid Nondigestible (%) |
|---|---|---|
| Fatty Acid Content | | |
| C6 | .55 | — |
| C8 | .24 | — |
| C10 | — | — |
| C13 | 0.04 | — |
| C14 | 0.04 | — |
| C16 | 0.84 | 9.1 |
| C17 | 0.05 | 0.1 |
| C18 | 1.29 | 6.4 |
| C18:1 | 16.63 | 64.4 |
| C18:2 | 0.10 | 18.9 |
| C18:3 | — | 0.3 |
| C20 | 4.05 | 0.3 |
| C22 | 74.17 | 0.2 |
| C24 | 0.5 | — |
| Other | 1.05 | 0.2 |
| Ester Distribution. | | |
| Octa | 92.4 | 88.2 |
| Hepta | 7.6 | 11.8 |
| Hexa | <.1 | <.1 |

The above ingredients are mixed at approximately 80° C. and then cooled to room temperature. The sample is then deaerated to insure no air bubbles are trapped within the sample. The final product has the following physical attributes:

| Yield Point | 8 dynes/cm² |
|---|---|
| Fluidity at 21° C. | 32 |
| Clarity as measured in NTU at 21° C. | 16 |
| Microscopic particle size of about | 0.5 μm or less |

Microscopic particle size of about 0.5 μm or less

EXAMPLE VI

Preparation of Fried Potato Chips

Norchip potatoes are used which have been sliced to a thickness of about 0.052 inches. The sliced potatoes are fried in a 5 pound oil capacity batch fryer at a controlled temperature of 365° F. for 3 minutes, 5 seconds. Approximately 225 chips are fried per batch in each of compositions of Examples III, IV and V. After frying, the product is drained, cooked and eaten.

EXAMPLE VII

Preparation of Fried Fish

One pound of Sysco frozen battered cod fillets are dropped in a 15 pound oil capacity frying kettle (fat composition from previous Example III). The temperature of the fryer is controlled at 350° F. and the fish is fried for 4 minutes. After frying, the product is drained for approximately 15 seconds, cooled slightly and eaten.

What is claimed is:

1. A pourable composition comprising:
   (A) a solid polyol fatty acid polyester having a complete melting point above about 37° C. wherein
   (i) the polyol has at least about 4 hydroxyl groups,
   (ii) the ester groups are comprised of (a) fatty acid radicals selected from the group consisting of $C_{12}$ or higher unsaturated fatty acid radicals, $C_2$–$C_{12}$ saturated fatty acid radicals, or mixtures thereof, and (b) $C_{20}$ or higher saturated fatty acid radicals at a molar ratio of (a):(b) being from about 1:15 to about 1:1, and
   (iii) at least about 4 of the hydroxyl groups of the polyol are esterified;
   (B) a liquid nondigestible oil having a complete melting point below about 37° C;
   (C) from 0% to about 90% by weight of a digestible oil having less than 5% solids at 21° C.; and
   (D) from 0% to about 10% hardstock;
   wherein the ratio of (A) to (B) is from about 1:99 to about 9:91 wherein the pourable composition has a yield point of not more than about 100 dynes/cm², wherein at least 15% by weight of the fatty acid radicals in (A) are $C_{20}$ or higher saturated fatty acid radicals, wherein the slope of the SFC profile of the mixture of (A) and (B) between 37° C. and 21.1° C. is from 0 to about −75, and wherein the combined level of (A) and (B) in said composition is at least about 10% by weight.

2. A pourable composition according to claim 1 wherein the solid polyol fatty acid polyester of (A) has (i) from about 4 to about 8 hydroxyl groups and (ii) ester groups which consist essentially of (a) fatty acid radicals selected from the group consisting of $C_{12}$ to $C_{26}$ unsaturated fatty acid radicals, $C_6$–$C_{12}$ saturated fatty acid radicals, or mixtures thereof, and (b) $C_{20}$–$C_{26}$ saturated fatty acids at a molar ratio of (a) to (b) being from about 1:7 to about 5:3.

3. A pourable composition according to claim 2 wherein the polyol of part (A) is sucrose and the ratio of (a) fatty acid radicals:(b) fatty acid radicals is from about 1:7 to about 3:5.

4. A pourable composition according to claim 2 wherein the fatty acid radicals of (A) (ii) (a) are selected from the group consisting of lauroleate, myristoleate, palmitoleate, oleate, elaidate, erucate, linoleate, acetate, caproate, caprylate, caprate, laurate, and mixtures thereof, and the fatty acid radicals of (A) (ii) (b) are selected from the group consisting of arachidate, behenate, lignocerate, cerotate, and mixtures thereof.

5. A pourable composition according to claim 3 wherein the solid polyol fatty acid polyester of (A) has ester groups in part (A)(ii) which consist essentially of (a) fatty acid radicals selected from the group consisting of $C_{18}$ mono- and/or diunsaturated fatty acid radicals, $C_{8-C12}$ saturated fatty acid radicals, or mixtures thereof, and (b) $C_{22}$ saturated fatty acid radicals.

6. A pourable composition according to claim 3 wherein at least about 30% by weight of the total fatty acid radicals in (A) are $C_{20}$ or higher saturated fatty acid radicals.

7. A pourable composition according to claim 6 wherein at least about 50% by weight of the total fatty acid radicals in (A) are $C_{20}$ or higher fatty acid radicals.

8. A pourable composition according to claim 7 wherein at least about 60% by weight of the total fatty acid radicals in (A) are $C_{20}$ Or higher fatty acid radicals.

9. A pourable composition according to claim 3 wherein the level of digestible oil is less than about 65% by weight.

10. A pourable composition according to claim 9 wherein the level of digestible oil is less than about 50% by weight.

11. A pourable composition according to claim 3 wherein said liquid nondigestible oil and said digestible oil have complete melting points below about 21° C.

12. A pourable composition according to claim 3 wherein the liquid nondigestible oil of part (B) is a polyol fatty acid polyester.

13. A pourable composition according to claim 12 wherein the liquid polyol polyester nondigestible oil of part (B) is a sugar or sugar alcohol fatty acid polyester.

14. A pourable composition according to claim 13 wherein the liquid polyol polyester nondigestible oil of part (B) is a sucrose fatty acid polyester.

15. A pourable composition according to claim 3 wherein the digestible oil (C) is a triglyceride.

16. A pourable composition according to claim 15 wherein the digestible oil (C) contains less than about 4.0% by weight of $C_{18:3}$ triunsaturated fatty acid radicals.

17. A pourable composition according to claim 3 having a fluidity at 21° C. of at least about 5 gm/30 sec.

18. A pourable composition according to claim 17 having a fluidity at 21° C. of at least about 15 gm/30 sec.

19. A pourable composition according to claim 18 having a fluidity at 21° C. of at least about 25 gm/30 sec.

20. A pourable composition according to claim 17 wherein the digestible oil has a complete melting point below about 10° C.

21. A pourable composition according to claim 20 wherein the digestible oil has a complete melting point below about 4° C.

22. A pourable composition according to claim 20 having an optical turbidity of not more than about 200 NTU.

23. A pourable composition according to claim 22 having an optical turbidity of not more than about 100 NTU.

24. A pourable composition according to claim 23 having an optical turbidity of not more than about 50 NTU.

25. A pourable composition according to claim 24 having an optical turbidity of not more than 5 NTU.

26. A pourable composition according to claim 3 wherein at least about 85% of the hydroxyl groups of the polyol are esterified.

27. A pourable shortening comprising:
(A) a solid polyol fatty acid polyester having a complete melting point above 37° C. wherein
  (i) the polyol is sucrose,
  (ii) the ester groups are comprised of (a) fatty acid radicals selected from the group consisting of $C_{12}$-$C_{26}$ mono- and/or di- unsaturated fatty acid radicals, $C_6$-$C_{12}$ saturated fatty acid radicals, or mixtures thereof, and (b) $C_{20}$-$C_{26}$ saturated fatty acid radicals at a molar ratio of (a):(b) being from about 1:7 to about 3:5, and
  (iii) at least about 6 of the hydroxyl groups of the polyol are esterified with said fatty acid groups;
(B) a liquid nondigestible sucrose fatty acid polyester oil having a complete melting point below about 37° C;
(C) from 0% to about 90% by weight of a digestible oil having less than about 5% solids at 21° C.; and
(D) from 0% to about 10% hardstock,
wherein (i) the ratio of (A) to (B) is from about 1:99 to about 9:91, (ii) the pourable composition has a yield point of not more than about 100 dynes/cm$^2$, (iii) the fluidity at 21° C. is at least 5 gm/30 sec, (iv) at least 30% by weight of the fatty acid radicals in (A) are $C_{20}$ or higher saturated fatty acid radicals, and (v) the slope of the SFC profile of the mixture of (A) and (B) between 37° C. and 21.1° C. is from 0 to about −0.5.

28. A cooking oil comprising:
(A) a solid polyol fatty acid polyester having a complete melting point above 37° C. wherein
  (i) the polyol is sucrose,
  (ii) the ester groups are comprised of (a) fatty acid radicals selected from the group consisting of $C_{18}$-$C_{26}$ mono- and/or diunsaturated fatty acid radicals, $C_6$-$C_{12}$ saturated fatty acid radicals or mixtures thereof, and (b) $C_{20}$-$C_{26}$ saturated fatty acid radicals at a molar ratio of (a):(b) being from about 1:7 to about 3:5, and
  (iii) at least about 6 of the hydroxyl groups of the polyol are esterified with said fatty acid groups;
(B) a liquid nondigestible sucrose fatty acid polyester oil having a complete melting point below about 21° C., and
(C) from 0% to about 90% by weight of a digestible oil
having a complete melt point less than 10° C., wherein (i) the ratio of (A) to (B) is from about 1:99 to about 9:91, (ii) the pourable composition has a yield point not more than about 100 dynes/cm$^2$, (iii) the fluidity at 21° C. is at least 15 gm/30 sec., (iv) the optical turbidity is not more than 200 NTU, (v) at least 30% by weight of the fatty acid radicals in (A) are $C_{20}$ or higher saturated fatty acid radicals, and (vii) the slope of the SFC profile of the mixture of (A) and (B) between 37° C. and 21.1° C. is between 0 and about −0.5.

29. A salad oil comprising:
(A) a solid polyol fatty acid polyester having a complete melting point above 37° C. wherein
  (i) the polyol is sucrose,
  (ii) the ester groups are comprised of (a) fatty acid radicals selected from the group consisting of $C_{18}$ mono- and/or diunsaturated fatty acid radicals, $C_8$-$C_{12}$ saturated fatty acid radicals or mixtures thereof, and (b) $C_{20}$-$C_{26}$ saturated fatty acid radicals at a molar ratio of (a):(b) being from about 1:7 to about 3:5, and (iii) at least about 6 of the hydroxyl groups of the polyol are esterified with said fatty acid groups;

(B) a liquid nondigestible sucrose fatty acid polyester oil having a complete melting point below 21° C.; and (C) from 0% to about 90% by weight of a digestible oil having a complete melt point below 4° C., wherein (i) the (1) ratio of (A) to (B) is from about 1:99 to about 3:97, (ii) the pourable composition has a yield point not more than about 100 dynes/cm$^2$, (iii) the fluidity at 21° C. is at least 25 gm/30 sec., and (iv) the optical turbidity is not more than about 50 NTU, (v) at least 30% by weight of the fatty acid radicals in (A) are C$_{20}$ or higher saturated fatty acid radicals, and (vi) the slope of the SFC profile of the mixture of (A) and (B) between 37° C. and 21.1° C. is between 0 and about −0.5.

30. A salad oil according to claim 29 wherein the optical turbidity is not more than 5 NTU.

31. A food composition comprising:

(A) a solid polyol fatty acid polyester having a complete melting point above 37° C. wherein (i) the polyol has at least about 4 hydroxyl groups, (ii) the ester groups are comprised of (a) fatty acid radicals selected from the group consisting of C$_{12}$ or higher unsaturated fatty acid radicals, C$_2$-C$_{12}$ saturated fatty acid radicals or mixtures thereof, and (b) C$_{20}$ or higher saturated fatty acid radicals at a molar ratio of (a):(b) being from about 1:15 to about 1:1, and (iii) at least about 4 of the hydroxyl groups of the polyol are esterified;

(B) a liquid nondigestible oil having a complete melting point below 37° C.;

(C) from 0% to about 90% by weight of a digestible oil having less than 5% solids at 21° C.; and (D) from 0% to 10% hardstock;

wherein the ratio of (A) to (B) is from about 1:99 to about 9:91 wherein the pourable composition has a yield point of not more than about 100 dynes/cm$^2$, wherein at least 15% by weight of the fatty acid radicals in (A) are C$_{20}$ or higher saturated fatty acid radicals, wherein the slope of the SFC profile of the mixture of (A) and (B) between 37° C. and 21.1° C. is between 0 and about −75, and wherein the combined level of of (A) and (B) in said composition is at least 10% by weight.

32. A food composition according to claim 31 wherein the solid polyol fatty acid polyester of (A) has (i) from about 4 to about 8 hydroxyl groups and (ii) ester groups which consist essentially of (a) fatty acid radicals selected from the group consisting of C$_{12}$ to C$_{26}$ mono- and/or diunsaturated fatty acid radicals, C$_6$-C$_{12}$ saturated fatty acid radicals or mixtures thereof, and (b) C$_{20}$-C$_{26}$ saturated fatty acids at a molar ratio of (a) to (b) being from about 1:7 to about 4:4.

33. A food composition according to claim 32 wherein the polyol of part (A) is sucrose and the ratio of (a) fatty acid radicals:(b) fatty acid radicals is from about 1:7 to about 3:5.

* * * * *